United States Patent
Wise et al.

[11] Patent Number: 5,945,138
[45] Date of Patent: Aug. 31, 1999

[54] CAM ADJUSTABLE FORMER FOR PLASTIC PIPE

[75] Inventors: John Wise; Larry L. Martin, both of Hamilton, Ohio

[73] Assignee: Advanced Drainage Systems, Inc., Columbus, Ohio

[21] Appl. No.: 08/224,544

[22] Filed: Apr. 7, 1994

[51] Int. Cl.[6] .......................... B29C 53/50; B29C 53/60
[52] U.S. Cl. ................ 425/391; 156/244.13; 156/429; 156/431; 425/325; 425/402; 425/505
[58] Field of Search .................. 156/244.13, 429, 156/431; 425/325, 391, 402, 505

[56] References Cited

U.S. PATENT DOCUMENTS

| | | | |
|---|---|---|---|
| 639,508 | 12/1899 | Bonta | 249/181 |
| 2,398,876 | 4/1946 | Bailey | 156/244.13 |
| 3,405,023 | 10/1968 | Eckenwiler et al. | 156/415 |
| 3,914,151 | 10/1975 | Poulsen | 156/425 |
| 4,155,796 | 5/1979 | Rambacher | 156/415 |
| 4,187,068 | 2/1980 | Vassar | 425/381 |
| 4,389,180 | 6/1983 | Gordon | 249/181 |
| 4,867,671 | 9/1989 | Nagayoshi et al. | 156/431 |
| 4,957,586 | 9/1990 | Keldany et al. | 156/195 |

*Primary Examiner*—Richard Crispino
*Attorney, Agent, or Firm*—Biebel & French

[57] ABSTRACT

An improved former assembly which can be used in the manufacture of plastic pipe with the former assembly comprising a plastic pipe former assembly having a housing, a center tube supported on the housing, and a plurality of rollers oriented about the center tube, with the improvement comprising a plurality of universal joint assemblies each having a first end and a second end, each of the first ends being connected to the housing and each of the second ends being connected to one of the rollers.

6 Claims, 6 Drawing Sheets

CAM ADJUSTABLE FORMER FOR PLASTIC PIPE

BACKGROUND OF THE INVENTION

This invention relates generally to a plastic pipe former assembly for use with a manifold assembly in the forming of a plastic pipe, and more particularly to an improved structure capable of forming more than just one diameter of pipe.

Plastic pipe has found a variety of uses especially relating to drainage. One of the concerns in the manufacture of plastic pipe is the attendant costs associated with the manufacturing equipment. In general, extruded plastic pipe is formed on a production line having a variety of specific machines incorporated into the manufacturing process.

One of the first machines is an extruder. Plastic powder, or more preferably pellets, is fed through the extruder where it is subjected to high temperatures such that the plastic melts. The plasticized plastic then proceeds through a feed tube, at the end of which the plastic enters into a typically drum shaped die. At the front of the die is the specific cross-section profile to be extruded. As the hot plastic comes out of the die, it passes over what are called calibrating or calibration fingers which assist in maintaining the desired cross-sectional form which has been extruded. These calibration fingers are part of the manifold assembly. The rest of the manifold assembly extends from above the die to well beyond the calibration fingers. In addition to the extruder and die, which is supported on a die post assembly, plastic pipe is manufactured using a former or forming head.

Until now, the former assemblies used to manufacture plastic pipe have been a very limiting factor in the manufacture of such pipe. For example, 48" interior diameter plastic pipe is very popular for large civil engineering applications. Existing prior art formers for manufacturing such pipe can basically make pipe of approximately that dimension, but the specific dimensions that ultimately result often depend on the specific type of plastic used. Attempting to "fine tune" the diameter of large diameter plastic pipe is not realistically possible.

Even more importantly however, is the fact that 42" pipe is also popular, and that in the existing art, to make pipe of that diameter requires an additional complete former assembly: a costly capital investment. There are other popular sizes of large diameter plastic pipe, namely 30", 36", 54" and 60", all of which sizes until now have required separate former assemblies as a condition for their manufacture. Thus it can be appreciated that for a company to manufacture the four most popular sizes of large diameter plastic pipe, it has been necessary to invest in at least four former assemblies. Even then, the manufacturing tolerances associated with the pipe formed on such machines is relatively large, since there has been no means to minutely adjust the diameter of the pipe as it is initially being formed.

Prior art former assemblies have been relatively limited as to their ability to manufacture more than just one diameter of plastic pipe, with that pipe having to have relatively large tolerances associated therewith. It is thus apparent that the need exists for an improved former assembly which manufactures a product having more than just one of the desired diameters of large diameter plastic pipe, and moreover a product whose diameter can be minutely adjusted.

SUMMARY OF THE INVENTION

The problems associated with prior former assemblies are overcome in accordance with the present invention by the presence of an improved former assembly which can be used in the manufacture of plastic pipe with the former assembly comprising a plastic pipe former assembly having a housing, a center tube supported on the housing, and a plurality of rollers oriented about the center tube, with the improvement comprising a plurality of universal joint assemblies each having a first end and a second end, each of the first ends being connected to the housing and each of the second ends being connected to one of the rollers.

Furthermore, the former has two pairs of cooperating plates, each pair of plates comprising a cam plate and a bearing block plate, each of the cam plates having formed therein a plurality of slots, each of the bearing block plates connected to a roller and each of the bearing block plates having connected thereto a shoulder bolt with bushing, each shoulder bolt with bushing extending through one of the slots, with each cam plate and bearing block plate able to be rotated relative to each other such that when the plates are rotated each respective shoulder bolt with bushing slides along its respective slot causing each roller to be adjusted radially relative to the center tube.

Additionally, the plastic pipe former assembly center tube has a main water inlet tube passing therethrough, with this main water inlet tube connected to a plurality of individual water inlet tubes. One each of these individual water inlet tubes are connected to a respective roller at the roller second end. Each roller is formed having an interior tube and an outer tube. Each roller second end is also connected to individual water outlet tubes. The individual water outlet tubes pass completely through the center tube in the direction of the roller first end.

There is also disclosed an improved former assembly for use in the manufacture of plastic pipe, with this former able to be adjusted to accomodate the forming of more than one diameter of plastic pipe. This improved former assembly comprises a housing, a center tube supported on the housing, a plurality of rollers oriented about the center tube with each of said rollers having a first end and a second end. There are a plurality of universal joint assemblies each having a first end and a second end, each of the first ends are connected to the housing and each of the second ends are connected to one of the rollers.

This improved former assembly also has two pairs of cooperating plates, each pair of plates comprising a cam plate and a bearing block plate, each pair of plates being connected to the rollers, the first pair of plates being located adjacent the first end of the rollers and the second pair of plates located adjacent the second end of the rollers.

This improved former assembly has cam plates having formed therein a plurality of slots. Further, each of the bearing block plates are connected to a roller and each of the bearing block plates have connected thereto a shoulder bolt with bushing. Each shoulder bolt with bushing extends through one of the slots. The cam plate and the bearing block plate being able to be rotated relative to each other such that when the plates are rotated each respective shoulder bolt with bushing slides along its respective slot causing each roller to be adjusted radially relative to the center tube.

This plastic pipe former assembly also has its center tube having a main water inlet tube pass therethrough. The main water inlet tube is connected to a plurality of individual water inlet tubes. One each of the individual water inlet tubes are connected to a respective roller at the roller second end. Each roller is formed having an interior tube and an outer tube. Each roller second end is also connected to individual water outlet tubes. The individual water outlet tubes pass completely through the center tube in the direction of the roller first end.

It is the primary object of the present invention to provide an improved former assembly which can manufacture pipe having at least two of the popular inner diameters of large diameter plastic pipe.

It is another object of the present invention to provide an improved former assembly which can slightly adjust the inner diameter of plastic pipe as it is formed to account for differences in the cooling of various types of plastic, and to allow manufacturing of pipe with more exacting tolerances.

Other objects and advantages of the invention will be apparent from the following description, the accompanying drawings, and the appended claims.

DETAILED DESCRIPTION OF THE INVENTION

Figure 1:
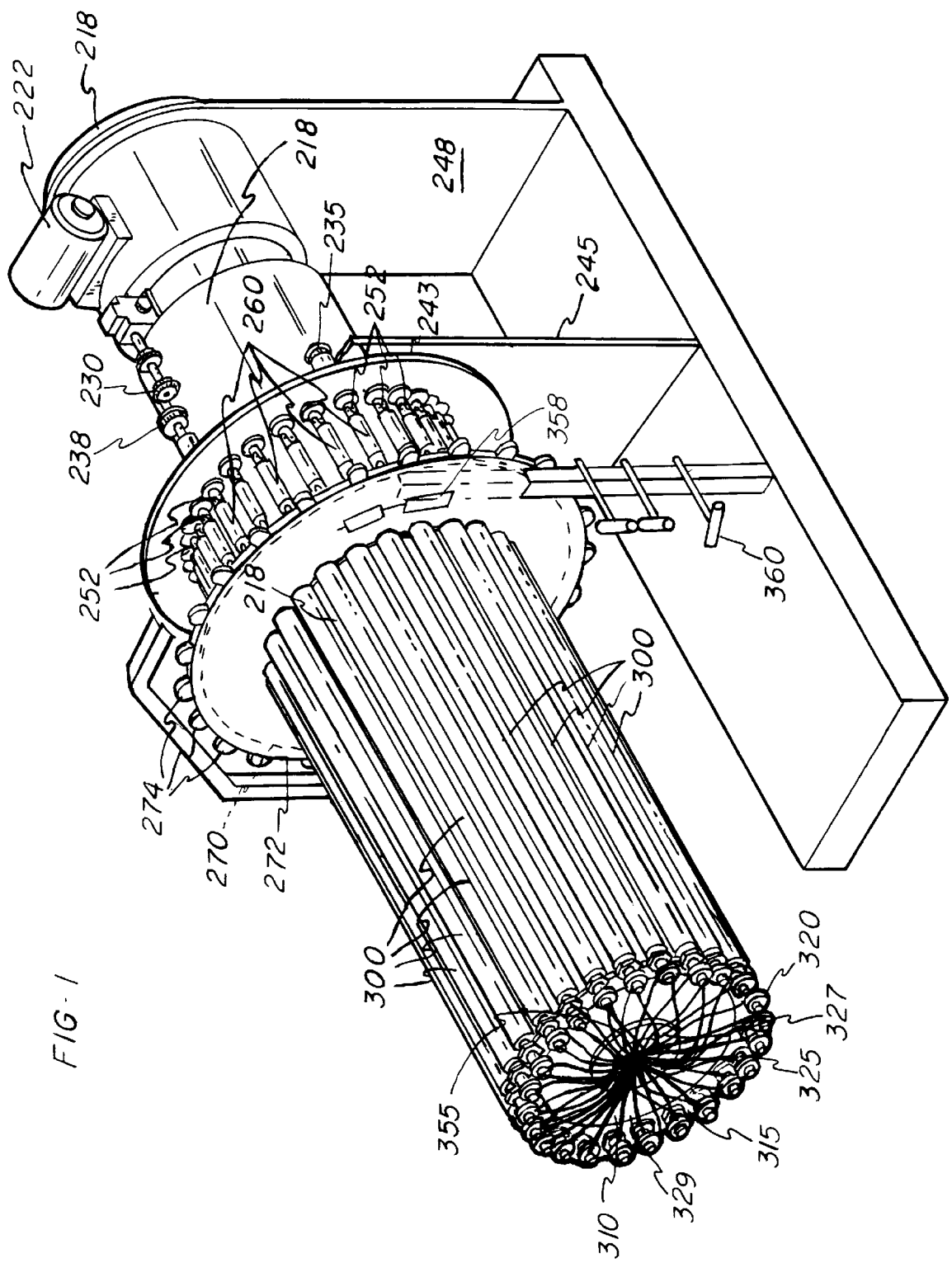
FIG. 1 discloses a perspective view of a former embodying the present invention.

Having reference to the drawings, attention is directed first to FIG. 1 which discloses a perspective view of a former embodying the current invention designated generally by the numeral 200. The former generally comprises a mounting or base 205, an upstream component 210 and a downstream component 215. As can be appreciated comparing FIGS. 1 and 2, a center tube 218 extends virtually the entire length of the former.

Figure 2:
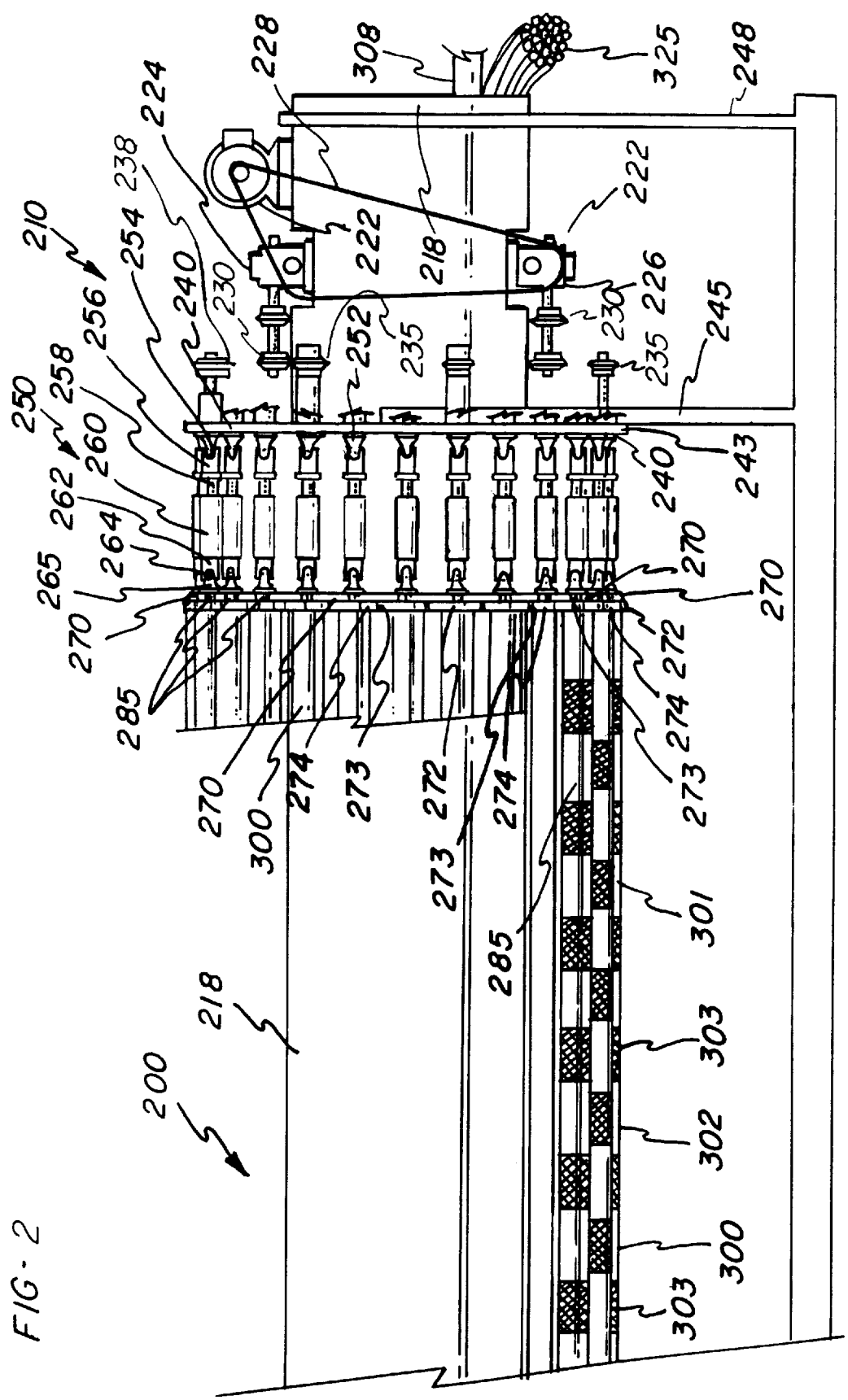
FIG. 2 discloses a partial side elevational view of the former of the invention.

FIG. 2 discloses the gear reducer sub-assembly associated with the serpentine chain drive of this invention. However, it is to be appreciated that a serpentine chain drive is not a new feature, nor is a gear reducer sub-assembly. In this particular invention, the motor 222 associated with the invention is preferably a Baldor 5 hp motor of the type which is commercially available. The first worm gear reducer 224 is preferably a Hub City worm gear reducer, model 451, as is the second worm gear reducer 226. Connecting the motor and two worm gear reducers is a 1" wide timing belt 228.

A chain 229, or more properly in the preferred embodiment of this invention 4 chains, connects the gear reducer sub-assembly 220 to a first set of sprockets 230, a second set of sprockets 235, and a third set of sprockets 238. Preferably the first sprockets 230 are four Martin 60 BTL2OH sprockets, attached in pairs to each of the worm gear reducers. Each sprocket supplies power to two of the chains. Furthermore, preferably each of the eight second sprockets 235 is a Martin 60 BB15H idler secured to the mounting ring, while the twenty-four third sprockets 238 are Martin 60 BTL16H sprockets. The various sprockets in conjunction with the chain serve to provide the power for the rollers of the former machine. For the sake of clarity, it will be noted that FIG. 2 discloses only part of the total number of sprockets, but at least one of each type is shown.

Figure 3:
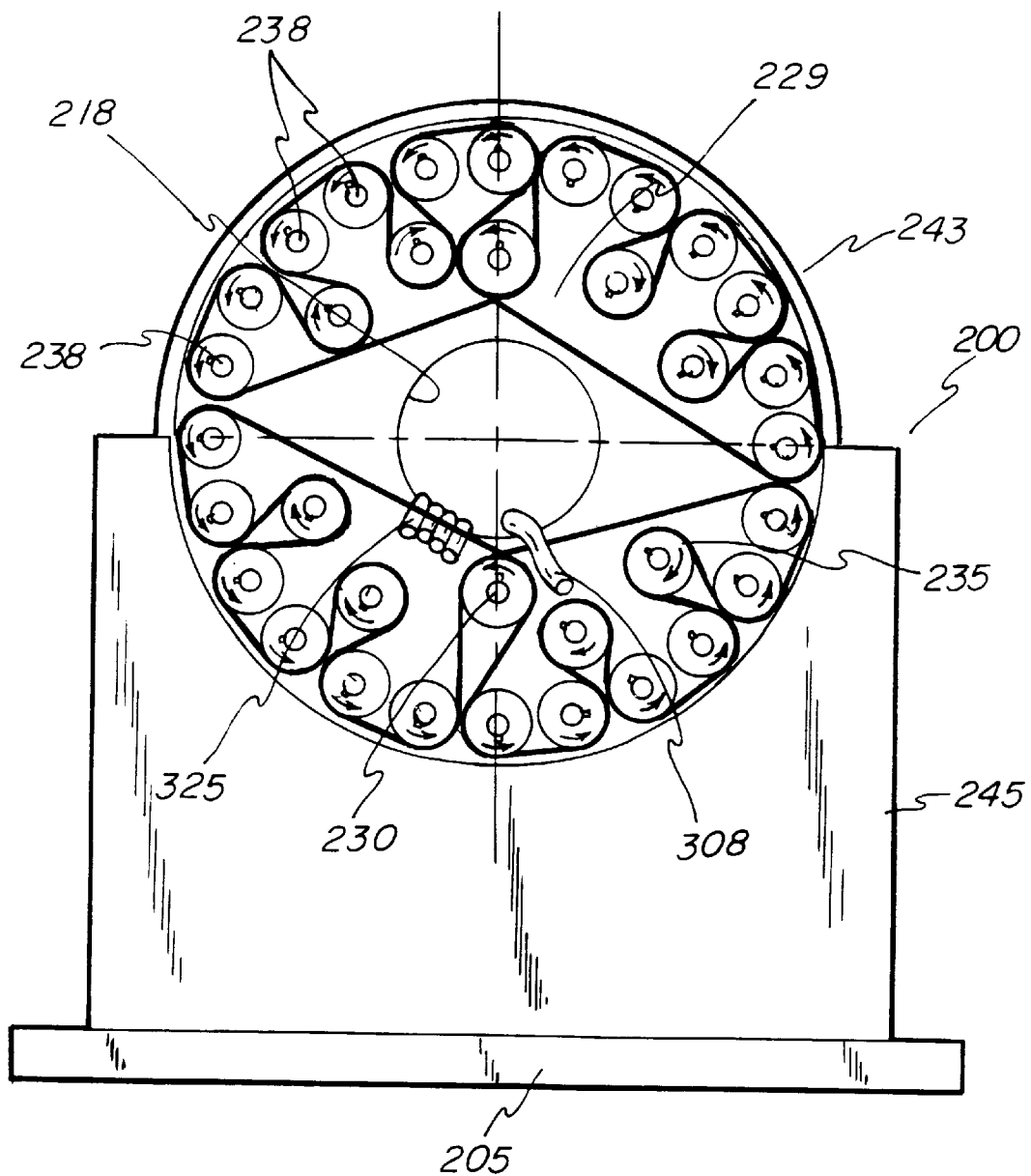
FIG. 3 discloses an upstream end elevational view, which for purposes of clarity does not include the gear reduction sub-assembly.

Comparing FIGS. 1, 2 and 3 discloses that the proximal end of the drive shaft assembly 240 is located adjacent mounting ring 243, which in turn is secured preferably by welding to the mounting ring support plate 245. It also will be appreciated that the center tube extends through the mounting ring 243. Also extending upwardly from the frame base is a pilot flange support plate 248 which provides additional support for the center tube.

Connected to the proximal end of the drive shaft assembly associated with each of the rollers of this invention is a universal joint assembly 250 having a first end yoke 252, a first cross member 254, a first intermediate yoke 256, a splined shaft 258, a splined coupling 260, a second intermediate yoke 262, a second cross member 264, and a second end yoke 265. All of these components are commercially available. In the preferred embodiment of the invention the yokes are Chicago Rawhide No. 1529, the crosses are Chicago Rawhide No. 1501, and the splined couplings and splined shafts are Hub City 03-32-00026 and 03-32-00030, respectively, as modified. The aforementioned coupling has a slug welded into the coupling end which will be adjacent to the yoke. This slug is then machined so that it will couple with the yoke, and a keyway is cut. Similarly, the spline shaft is modified by cutting it in half, followed by turning the end in and keying it to fit into the yoke end. Each of the third set of sprockets is connected through a respective aperture in the mounting ring to the first end yoke of a universal joint assembly. Similarly, the second end yoke has a bushing spacer 285 positioned between it and the upstream bearing block plate.

Figure 4:
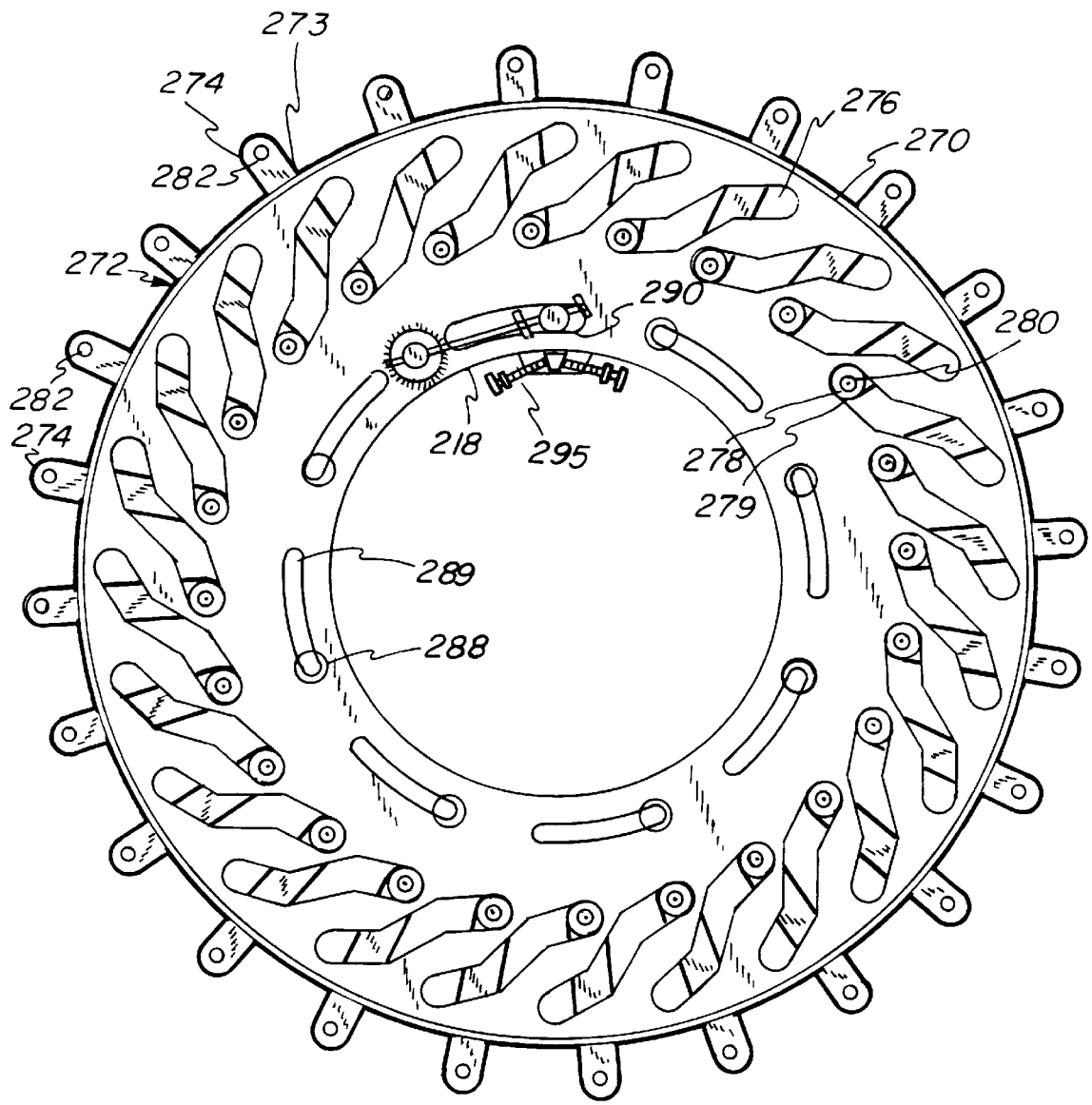
FIG. 4 discloses an elevational view of the upstream cam plate taken looking downstream.

There is also disclosed, as can be appreciated from FIGS. 2 and 4, an upstream cam plate 270, which preferably is a ⅞" thick steel plate. Adjacent the upstream cam plate 270 and immediately downstream therefrom is an upstream bearing block plate 272 fabricated from 1⅛" thick aluminum having a plurality of bearing block plate notches 273 formed therein. Into each of these generally rectangularly shaped notches side one of a number of bearing blocks 274, i.e., contained therein. The width of each notch is approximately 3", and the depth of each is approximately 6". The width of each bearing block is slightly less than that of the width of each notch. However, the height of each bearing block is approximately 9", such that the top portion of each bearing block extends above the peripheral edge of the bearing block plate. The number of bearing blocks, as well as notches, is equivalent to the number of rollers, which in the preferred embodiment of this invention is twenty-four.

Into the central most end of each of the bearing blocks 274 is screwed a shoulder bolt 278, with this shoulder bolt passing through bushing 279. The exterior surface of each shoulder bolt 278 has formed therein a hex cavity 280 for use in tightening or loosening the shoulder bolt. Each shoulder bolt also passes through a respective upstream cam plate slot 276. Each upstream cam plate slot is a roughly S shaped slot, which in the preferred embodiment of the invention has three straight component sections angled with respect to each adjacent section.

Furthermore, at the outermost end of each bearing blocks 274 is a bearing block aperture 282 through which the former roller first end 285 passes. The former roller first end 285 is secured to the second end yoke 265 of the universal joint assembly 250.

It will also be appreciated that seven lock down bolts 288 are screwed into the upstream bearing block plate 272. Each of these lock down bolts pass through a respective arcuate lock down bolt slot 289 on the upstream cam plate.

To facilitate the transition between two of the pipe sizes capable of being formed with this invention, the size adjustment bolt 290 is must be moved. The size adjustment bolt is formed comprising an adjusting nut which is able to pivot within a housing, which housing is a welded cylinder which extends outwardly from the face of the cam plate. The adjusting nut has a screw threaded channel which extends therethrough parallel to the cam plate. The adjustment bolt also comprises a fixed adjusting screw anchor which is secured to the bearing block plate. Directly adjacent the adjusting screw anchor is a split set collar which is clamped over the screw threaded bolt which extends through the adjusting screw anchor and hence through the adjusting nut. On the opposite side of the adjusting screw anchor is a nut at the end of the bolt to assist in its turning. This size adjustment bolt also adjusts the fine adjustment that can be made with respect to a pipe.

To facilitate movement of the size adjustment bolt, the lock down bolts must first be loosened. Once the lock down bolts 288 are sufficiently loosened, turning the screw threaded size adjustment bolt itself results, depending on which direction it is turned, in either pulling the adjusting nut towards, or pushing it away from the adjustment screw anchor, either of which motions will rotate the upstream cam plate adjacent the bearing block plate 272 as the bushings 279 roll in their respective upstream cam plate slots. This movement causes each bearing block, and hence the end of the roller secured in that bearing block aperture, to move. Consequently, all twenty-four rollers can be moved radially so as to permit the former to accomodate two sizes of pipe, namely 42" and 48" in the preferred embodiment of the invention, when the shoulder bolts are in opposite ends of the upstream cam plate slots.

Also secured to the bearing block plate through a wider arcuate notch in the cam plate is the skew angle adjustment 295. It will be appreciated the the rollers 300 are at a slight angle with respect to each other. This angle helps to regulate the pipe as a pipe section is fed onto the former rollers from an adjacent die manifold assembly. By adjusting the angle of the rollers, the rate the plastic moves along the rollers can be controlled. This rate is important since it controls the speed at which the formed pipe feeds off the former assembly, and this speed is important as it can permit a gap to exist between adjacent pipe sections or in the alternative crowd the weld between adjacent pipe sections.

To understand how the skew angle adjustment works, it is necessary to understand how the cam plate, bearing block plate, and center tube are positioned. Located intermediate the surface of the bearing block plate and the center tube is an inner ring which is bolted to the center tube. A portion of the inner ring extends radially along the side of the bearing block plate, such that the bearing block plate is secured between the inner ring and the cam plate. Through the wide arcuate notch, two tabs, each with an eye, are secured at opposite ends of the bearing block plate. Each eye has inserted therethrough a bolt, so that the screw threaded end of each bolt faces the opposing bolt. Between these bolt ends is a plate which is also secured to the bearing block plate. By loosening one of the bolts and tightening the other the cam plate and bearing block plate can be made to move as one so as to adjust the skew angle of the rollers.

Figure 6:
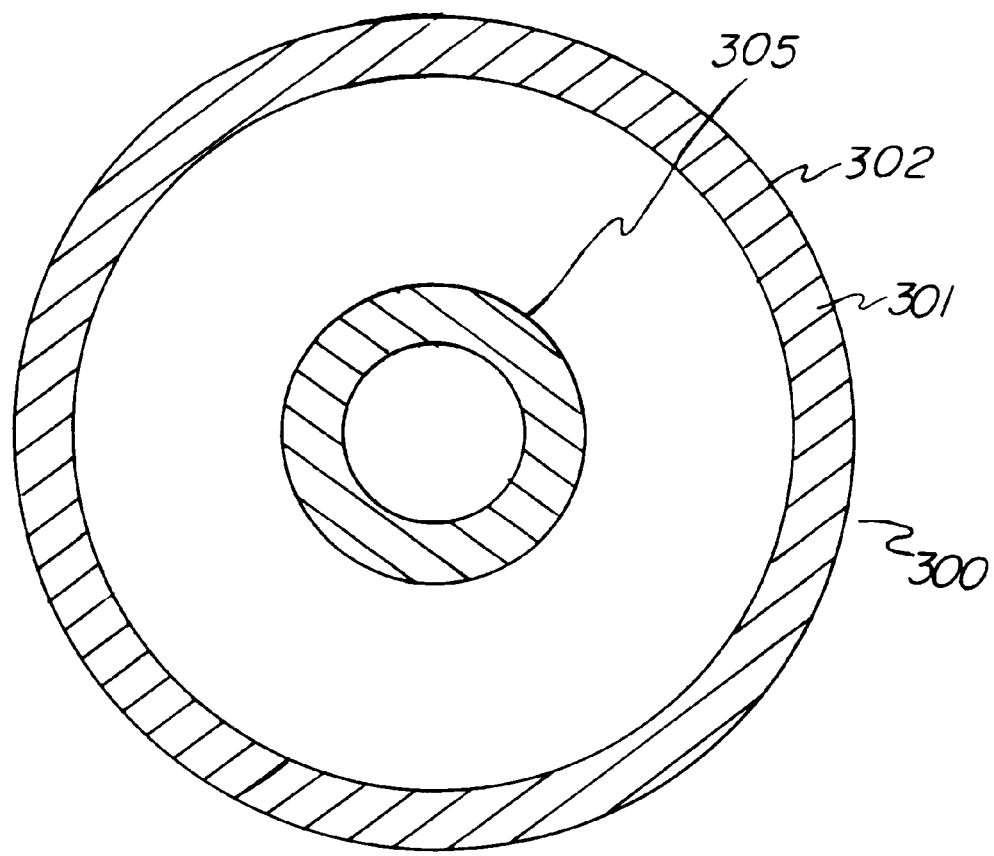
FIG. 6 discloses a vertical sectional view of just the former roller.

Having reference to a comparison of FIGS. 1 and 6, it will be appreciated that each roller 300 is comprised of a 4" outer diameter steel outer tube 301 having an outer surface 302 having knurled surface portions 303. These knurled surface portions 303 are preferably 4" in width and are spaced 18" apart. Also they are staggered with respect to their position on adjacent rollers. Each roller 300 also has an interior tube 305.

From a comparison of FIGS. 1, 2, and 3 it will be seen that a ⅜" main water inlet tube 308 passes along through the center tube 218 to the other end of the former where the main water inlet tube connects to a manifold 310 through which the water flows into a plurality of individual water inlet tubes 315. Each of the individual water inlet tubes 315 in turn is connected to a rotary union 320, which in the preferred embodiment of the invention is manufactured by Deublin. Also connected to each rotary union is an individual water outlet tube 325.

In actual operation, cool water passes through the main water inlet tube into the manifold 310. From there the water flows into the individual water inlet tubes. The water then enters the rotary union from where it enters the interior tube 305. The water then passes through the interior tube towards the upstream component 210 of the former. When the water reaches the opposite end of the interior tube it circulates using conventional fluid flow technology into the outer tube 301 of the roller 300. The water then circulates back through the roller towards the downstream component 215 where it exits through the rotary unions into the individual water outlet tubes. This cool water helps to cool the plastic pipe as it wraps around the former rollers.

Figure 5:
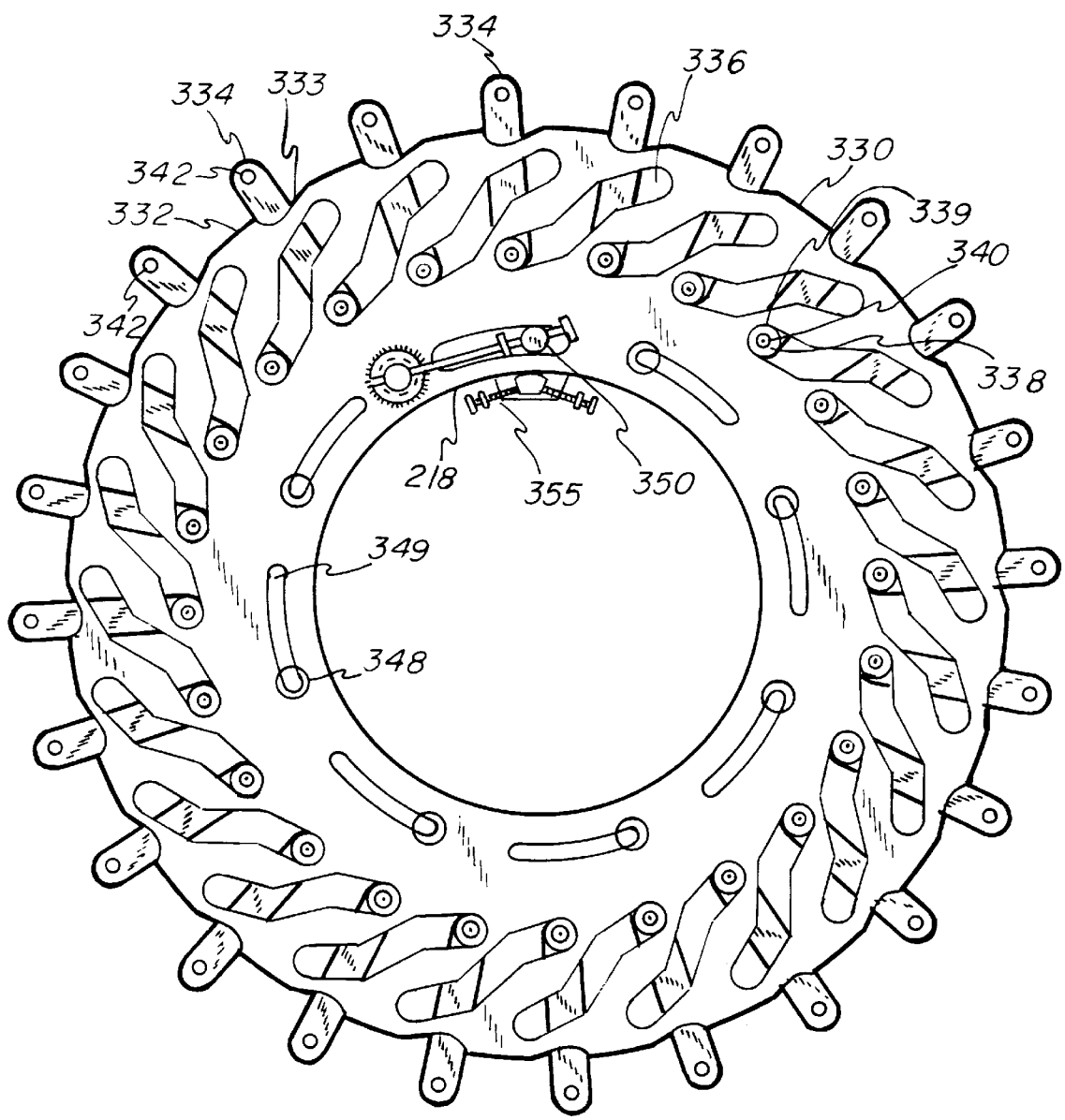
FIG. 5 discloses an end elevational view of the downstream cam plate taken looking upstream.

There is also disclosed, as can be appreciated from a comparison of FIGS. 1 and 5, two manifold apertures through which the individual water outlet tubes 325 pass, preferably twelve through each aperture. The water outlet tubes then pass along the interior of the center tube until they emerge adjacent pilot flange support plate 248. Anti-rotation brackets 329 which restrain the movement of the water outlet tubes, are secured to each shoulder bolt 338.

Also disclosed is a downstream cam plate 330, which preferably is a ⅞" thick steel plate. Adjacent the downstream cam plate 330 and immediately upstream therefrom is an downstream bearing block plate 332 fabricated from 1⅛" aluminum having a plurality of bearing block plate notches 333 formed therein. Into each of these generally rectangularly shaped notches slide one of a number of bearing blocks 334, i.e, contained therein. Once again, the width of each notch is approximately 3", and the depth of each is approximately 6". The width of each bearing block is slightly less than that of the width of each notch. However, the height of each bearing block is approximately 8½", such that the top portion of each bearing block extends above the peripheral edge of the bearing block plate. The number of bearing blocks, as well as notches, is equivalent to the number of rollers, which in the preferred embodiment of this invention is twenty-four. Thus it can also be appreciated that the rollers taper downwardly by 1" from their attachment near the upstream cam plate to their attachment near the downstream cam plate, since the bearing block apertures are positioned ½" further outwardly at the upstream bearing block plate. This tapering is to account for the cooling of the plastic. Inside each upstream and downstream bearing block aperture is a bearing adjacent the former roller assembly first end or second end respectively.

Into the central most end of each of the bearing blocks 334 is screwed a shoulder bolt 338, with this shoulder bolt passing through bushing 339. The exterior surface of each shoulder bolt 338 has formed therein a hex cavity 340 for use in tightening or loosening the shoulder bolt. Each shoulder bolt also passes through a respective downstream cam plate slot 336. Each downstream cam plate slot is a roughly S shaped slot, which in the preferred embodiment of the invention has three straight component sections angled with respect to each adjacent section. Furthermore, at the outermost end of each bearing blocks 334 is a bearing block aperture 342 through which the former roller second end 344 passes.

It will also be appreciated that seven lock down bolts 348 are screwed into the downstream bearing block plate 332. Each of these lock down bolts pass through a respective arcuate lock down bolt slot 349 on the downstream cam plate.

To facilitate the transition between two of the pipe sizes capable of being formed with this invention, the size adjustment bolt 350 must be moved. The size adjustment bolt is formed comprising an adjusting nut which is able to pivot within a housing, which housing is a welded cylinder which extends outwardly from the face of the cam plate. The adjusting nut has a screw threaded channel which extends therethrough parallel to the cam plate. The adjustment bolt also comprises a fixed adjusting screw anchor which is secured to the bearing block plate. Directly adjacent the adjusting screw anchor is a split set collar which is clamped over the screw threaded bolt which extends through the adjusting screw anchor and hence through the adjusting nut. On the opposite side of the adjusting screw anchor is a nut at the end of the bolt to assist in its turning. This size adjustment bolt also adjusts the fine adjustment that can be made with respect to a pipe.

To facilitate movement of the size adjustment bolt, the lock down bolts must first be loosened. Once the lock down bolts 288 are sufficiently loosened, turning the screw threaded size adjustment bolt itself results, depending on which direction it is turned, in either pulling the adjusting nut towards, or pushing it away from the adjustment screw anchor, either of which motions will rotate the upstream cam plate adjacent the bearing block plate 272 as the bushings 279 roll in their respective upstream cam plate slots. This movement causes each bearing block, and hence the end of the roller secured in that bearing block aperture, to move. Consequently, all twenty-four rollers can be moved radially so as to permit the former to accomodate two sizes of pipe, namely 42" and 48" in the preferred embodiment of the invention, when the shoulder bolts are in opposite ends of the upstream cam plate slots. Also secured to the downstream bearing block plate is the sku angle adjustment 355. It is positioned and operates just as does sku angle adjustment 295 discussed above.

In operation, the former of this invention has the plastic wall component formed by extrusion through a die head on an adjacent die manifold assembly wound about the former as is known in the art until the first end wall of the wall component is directly adjacent the second end wall of the wall component. After the wall component exits the diehead, a water cooled side wall guide, preferably fabricated from aluminum and secured to the former, stabilizes the first end wall of the wall component by cooling it. A ceramic heater attached to the die post assembly heats, or more accurately reheats, the second end wall. The adjacent wall components then have their respective end walls fused together.

As the end walls fuse together, preferably three TEFLON® rollers attached to the housing of the former roll the seam down so that the exterior wall of the pipe appears relatively smooth. To further assist in the cooling of the plastic pipe as it winds around the former, a light mist of water is applied to the outer surface of the now tubular plastic pipe. Preferably at least one cloth, and more preferably two, draped onto the pipe acts to spread the water out onto the pipe's surface to further effectuate cooling. Also preferably a last cloth is draped over the pipe to assist in drying the pipe surface.

It will be readily apparent from the foregoing detailed description of the illustrative embodiment of the invention that a particularly novel and extremely unique former assembly is provided. While the form of apparatus described herein constitutes the preferred embodiment of the invention, it is to be understood that the invention is not limited to this precise form of apparatus and that changes may be made therein without departing from the scope of the invention which is defined in the depended claims.

What is claimed is:

1. In a plastic pipe former assembly comprising a housing, a center tube supported on said housing, and a plurality of rollers oriented about said center tube, wherein the improvement comprises a plurality of universal joint assemblies each having a first end and a second end, each of said first ends being connected to one of said rollers, and two pairs of cooperating plates, each pair of plates comprising a cam plate and a bearing block plate, said cam plates having formed therein a plurality of slots, each of said bearing block plates having a plurality of notches formed therein, with each of the notches containing a bearing block, each of the blocks being connected to a roller and each of said bearing blocks having connected thereto a shoulder bolt with bushing, each said shoulder bolt with bushing extending through one of said slots, said cam plate and said bearing block plate able to be rotated relative to each other such that when said plates are rotated each respective shoulder bolt with bushing slides along its respective slot causing each roller to be adjusted radially relative to said center tube.

2. The plastic pipe former assembly according to claim 1 wherein said center tube has a main water inlet tube passing therethrough, said main water inlet tube connected to a plurality of individual water inlet tubes, one each of said individual water inlet tubes connected to a respective roller at the roller second end, each roller formed having an interior tube and an outer tube, each roller second end also connected to individual water outlet tubes, said individual water outlet tubes passing completely through said center tube in the direction of the roller first end.

3. A plastic pipe former assembly for use in the manufacture of plastic pipe, said former assembly able to be adjusted to accommodate the forming of more then one diameter of plastic pipe, said former assembly comprising a housing, a center tube supported on said housing, a plurality of rollers oriented about said center tube, each of said rollers having a first end and a second end, a plurality of universal joint assemblies each having a first end and a second end, each of said first ends being connected to said housing and each of said second ends being connected to one of said rollers, and two pairs of cooperating plates, each pair of plates comprising a cam plate and a bearing block plate, each having a plurality of notches formed therein, with each of the notches containing a bearing block, each of the blocks being connected to said rollers, the first pair of plates located adjacent the first end of said rollers and said second pair of plates located adjacent the second end of said rollers.

4. A plastic pipe former assembly according to claim 3 wherein said cam plates having formed therein a plurality of slots, and each of said bearing blocks having connected thereto a shoulder bolt with bushing, each said shoulder bolt with bushing extending through one of said slots, said cam plate and said bearing block plate able to be rotated relative to each other such that when said plates are rotated each respective shoulder bolt with bushing slides along its respective slot causing each roller to be adjusted radially relative to said center tube.

5. The plastic pipe former assembly according to claim 3 wherein said center tube has a main water inlet tube pass therethrough, said main water inlet tube connected to a plurality of individual water inlet tubes, one each of said individual water inlet tubes connected to a respective roller at the roller second end, each roller formed having an interior tube and an outer tube, each roller second end also connected to individual water outlet tubes, said individual water outlet tubes passing completely through said center tube in the direction of the roller first end.

6. A former assembly for use in the manufacture of plastic pipe, said former able to be adjusted to accommodate the forming of more then one diameter of plastic pipe, said former assembly comprising a housing, a center tube supported on said housing, a plurality of rollers oriented about said center tube, each of said rollers having a first end and a second end, a plurality of universal joint assemblies each having a first end and a second end, each of said first ends being connected to said housing and each of said second ends being connected to one of said rollers, and two pairs of cooperating plates, each pair of plates comprising a cam plate and a bearing block plate, each pair of plates being connected to said rollers, the first pair of plates located adjacent the first end of said rollers and said second pair of plates located adjacent the second end of said rollers, said cam plates having formed therein a plurality of slots, each of said bearing block plates having a plurality of notches formed therein, with each of the notches containing a bearing block, each of the blocks being connected to a roller and each of said bearing blocks having connected thereto a shoulder bolt with bushing, each said shoulder bolt with bushing extending through one of said slots, said cam plate and said bearing block plate able to be rotated relative to each other such that when said plates are rotated each respective slot causing each roller to be adjusted radially relative to said center tube, said center tube having a main water inlet tube pass therethrough, said main water inlet tube connected to a plurality of individual water inlet tubes, one each of said individual water inlet tubes connected to a respective roller at the roller second end, each roller formed having an interior tube and an outer tube, each roller second end also connected to individual water outlet tubes, said individual water outlet tubes passing through said center tube in the direction of the roller first end.

* * * * *